United States Patent [19]

Rankins

[11] 3,941,340

[45] Mar. 2, 1976

[54] BOAT FLAG HOLDER

[76] Inventor: Leon B. Rankins, 6111 Hillside Drive, El Sobrante, Calif. 04803

[22] Filed: Sept. 9, 1974

[21] Appl. No.: 504,528

[52] U.S. Cl. .................................................. 248/40
[51] Int. Cl.² .......................................... A01K 97/10
[58] Field of Search ........... 248/40, 41, 42, 43, 293; 403/96, 98, 161

[56] References Cited

UNITED STATES PATENTS

| | | | |
|---|---|---|---|
| 110,434 | 12/1870 | Clarke | 248/43 |
| 121,735 | 12/1871 | Thompson | 403/161 |
| 854,424 | 5/1907 | Ketterer | 403/98 X |
| 1,036,164 | 8/1912 | Teppert | 403/98 |
| 2,692,106 | 10/1954 | Herrmann | 248/40 |
| 3,540,685 | 11/1970 | Gualano | 248/40 |
| 3,802,112 | 4/1974 | Banner | 248/42 |

FOREIGN PATENTS OR APPLICATIONS

| | | | |
|---|---|---|---|
| 632,813 | 12/1949 | United Kingdom | 248/40 |

*Primary Examiner*—William H. Schultz
*Attorney, Agent, or Firm*—Harris Zimmerman

[57] ABSTRACT

A holder for the shaft or pole of a signal pole used in boats to indicate that an occupant of the craft, or a water skier being towed by the craft, is in the water. The holder is comprised of a pair of relatively rotatable disk-like members, the first of which is attached to the boat, and the other of which is rotatably secured thereto. The second member receives a flag pole or shaft and as the member rotates the shaft is moved between a vertical operative position and a horizontal inoperative position. Automatic stop means control the rotation so as to readily position the shaft in said two positions.

5 Claims, 6 Drawing Figures

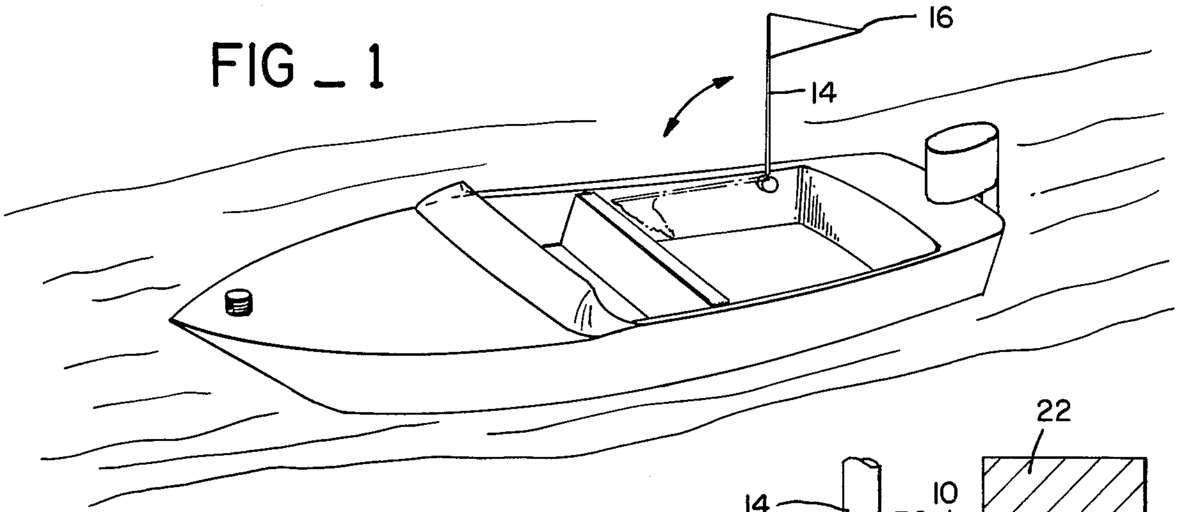
FIG_1
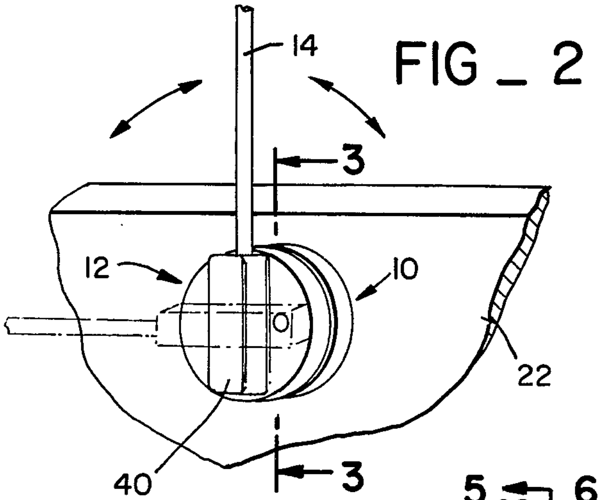
FIG_2
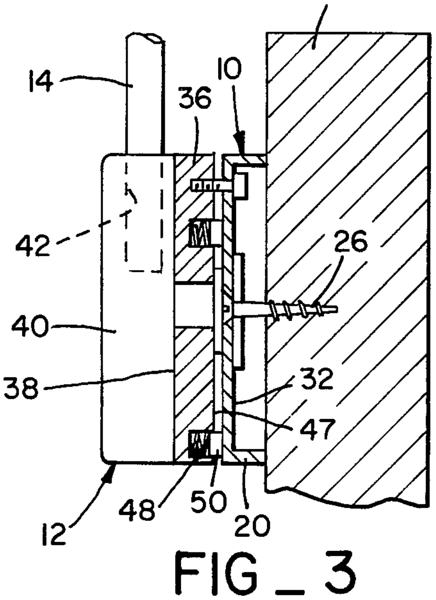
FIG_3
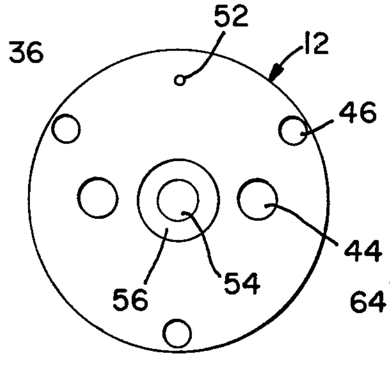
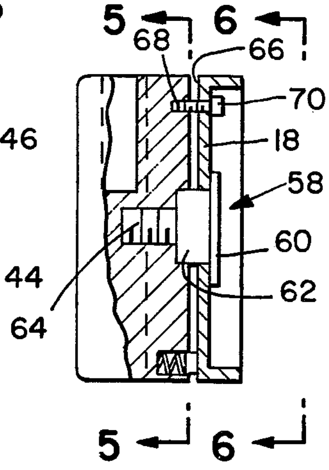
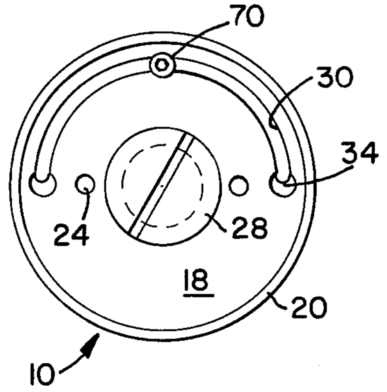
FIG_5
FIG_6
FIG_4

BOAT FLAG HOLDER

BACKGROUND OF THE INVENTION

In the operation of small water craft, it is frequently desirable, if not essential, to signal other oncoming craft that one of the boat's occupants is swimming in the water, or that a water skier being towed has fallen into the water. Such signalling is, of course, to prevent the oncoming boat from running into or over the hard-to-see person in the water. Such signalling frequently requires the operator to lift and wave a flag and then to lay the flag down when no further signalling is required. This is tedious and time consuming, and frequently the operator has other chores which prevent his handling and raising of a signal flag.

In accordance with this invention, a simple holder is provided which may be permanently (or temporarily) attached to a boat. The holder will receive and support the pole or shaft of a signal flag, and is capable of easily moving and maintaining the flag either in an operative, raised visible position or an inoperative, lowered, invisible position.

THE DRAWING

FIG. 1 is a perspective view of a boat with the flag holder of the present invention installed thereon;

FIG. 2 is a perspective view of the holder;

FIG. 3 is a cross-sectional view taken on line 3—3 of FIG. 2;

FIG. 4 is another cross-sectional view similar to FIG. 3;

FIG. 5 is a view taken on line 5—5 of FIG. 4; and

FIG. 6 is a view taken on line 6—6 of FIG. 4.

DESCRIPTION OF THE PREFERRED EMBODIMENT

The signal flag holder of the present invention generally comprises a pair of cooperating disk-like members 10 and 12, the member 10 being adapted for securance to a suitable portion of a boat, and the member 12 being rotatably secured to the member 10 in a manner and for the purposes hereinafter set forth. As should be made clear at the outset, however, the member 12 is provided with an opening for receiving the shaft 14 of a flag or signal device 16 so that as the member 12 is rotated, the flag may be selectively moved between a stowed, inoperative, and generally hidden position and a vertically disposed, operative, and highly visible position.

The member 10 includes a flat circular web portion 18 and a continuous circumferential annular flange portion 20, the outer edge of the latter being positioned against a suitable part 22 of the boat structure. A pair of apertures 24 positioned along a diameter of the web 18 permits attachment of the member 10 to the boat by means of screws 26. The web is also provided with an enlarged central opening 28, and an arcuate slot 30 which extends adjacent flange 20 through an arc of about 180°. The face 32 of the web which is adjacent the boat structure has three shoulders or stops 34 positioned along the slot which may be provided by drilling radially enlarged bores at the slot for approximately one-half the thickness of the web. One such stop is positioned at each end of the slot 30 and the third stop is disposed equidistant from the other two stops.

Referring now to member 12, it will be seen to comprise a circular plate-like disk 36 of substantially the same diameter as member 10. The outermost face 38 of disk 36 is provided with a diametrically extending rib 40 which serves as a manually engageable handle for rotating the disk. Rib 40 is provided with a bore 42 for receiving the flag shaft 14.

A pair of apertures 44 extend through the disk which are aligned with the apertures 24 in web 18 to permit a screw driver to be inserted through holes for screw attaching member 10 to the boat without requiring separation of members 10 and 12. Three circumferentially spaced bores 46 extend into disk 36 from the side 47 opposite the face 38, each bore receiving a spring 48 and a teflon bushing 50 which extends beyond the face of side 47.

Side face 47 also has a tapped hole 52 and a central tapped hole 54 merging into an enlarged counterbore 56.

To secure the members 10 and 12 together for relative rotary movement therebetween, there is first provided a screw 58 having an enlarged head 60, a central body 62 of substantially the same diameter as the web opening 28, and a threaded shank 64 which enters into the tapped hole 54. As best seen in FIGS. 3 and 4, the side face 47 of member 12 is disposed adjacent and opposite the web face 66 and resiliently spaced therefrom by the bushings 50 therebetween. In order to control the relative rotation of the members, a threaded stud 68 is inserted through web slot 30 from the web face 32 and engaged with the hole 52 in member 12. The stud has an enlarged head 70 and has an outward opening for receiving an Allen wrench.

With member 10 secured to the boat, manual pressure of member 12 towards member 10 compresses the springs 48 and moves the head 70 of the stud away from face 32 and thus permits manual rotation of member 12 until the stud reaches an end of the slot. Upon nrelease of the pressure, the springs again gently urge the members apart, and the stud head will snap into position in one of the stops 34, and prevent further rotation until inward pressure and rotary force is again applied to member 12 via its handle 40. Once the head leaves a stop, the inward pressure may be ceased, and the parts rotated until the stud head snaps into the next stop.

As will be understood, when the handle 40 is in a vertically upright position, the flag shaft will also be vertically disposed and the flag visible to other boatsmen. Here, the stud head 70 will be in the position shown in FIG. 6. When the handle is rotated 90°, in either direction, to engage a stop at either end of the slot 30, the handle will be in a horizontal position and the flag inoperative and invisible to other boats, as shown in phantom lines in FIG. 1.

I claim:

1. A holder for a signal flag, including: a first generally planar member; means for attaching said first member to a supporting structure; a second generally planar member; means securing said second member to said first member for rotation about an axis generally normal to the plane of said members; said second member having means for holding therein a signal flag shaft so that the shaft is moveable in a plane generally normal to the rotational axis between a raised first signal position and a lowered second storage position as said second member is rotated about said axis with respect to said first member; said second member is rotated about said axis with respect to said first member; said second member having a rib extending outwardly from the face of said second member opposite from said first member, extending diametrically with respect to and perpendicular to said axis to constitute handle means for manually rotating said second member with respect to said first member; said rib further having a blind bore perpendicular with respect to said axis and longitudinally with respect to said rib, and constituting said means for holding a signal flag shaft; said means adapted for attaching said first member including at least two bores parallel to and spaced from said axis extending through said first member for receiving therein threaded means to engage the supporting structure; and said second member having through bores aligned with respective ones of said first member through bores in one rotated position of said second member with respect to said first member and being of a diameter substantially larger than the diameter of said first member bores for completely passing therethrough said threaded members and a driver tool for rotating said threaded members.

2. The holder of claim 1, wherein said second member is in one piece and consists essentially of, in outer configuration, a circular outer periphery, a planar face opposing said first member planar face, and an outer remaining portion of said rib and planar portions on either side of said rib parallel to said faces.

3. A holder for a signal flag, including: a first generally planar member; means for attaching said first member to a supporting structure; a second generally planar member; means securing said second member to said first member for rotation about an axis generally normal to the plane of said members; said second member having means for holding therein a signal flag shaft and moving the shaft in a plane generally normal to the rotational axis between a raised first signal position and a lowered second storage position as said second member is rotated about said axis with respect to said first member; one of said members having an arcuate through slot concentric with respect to said axis; a headed member extending through said arcuate slot and being rigidly received within the other of said members at one end and having its head at its opposite end on the opposite side of said slot from said other member; a plurality of enlarged recesses along said slot and opening axially away from said other member and of a size for receiving therein said head, to constitute means for positively preventing relative rotation of said first and second members about said axis when said head is received within one of said recesses and permitting free relative rotation of said first and second members about said axis when said head is axially spaced from said recesses; said securing means mounting said first and second members for limited axial movement with respect to each other for at least a distance sufficient to permit engagement of said head within one of said recesses in one position and to provide axial spacing between said head and said recesses in an other position; spring means biasing said first and second members away from each other and into said one position, and elastically yielding upon movement of said first and second members axially from said one position to said another position.

4. The holder of claim 3, wherein said spring means includes at least three blind axial bores in the face of one of said members and opening outwardly towards the other of said members, a coil spring compressed within each of said blind bores, and a bearing material plunger partially extending within each of said blind bores and engaging its respective coil spring at one axial end and the face of said other member at its opposite other axial end.

5. A holder for a signal flag, including: a first generally planar member; means for attaching said first member to a supporting structure; a second generally planar member; means securing said second member to said first member for rotation about an axis generally normal to the plane of said members; said second member having means for holding therein a signal flag shaft and moving the shaft in a plane generally normal to the rotational axis between a raised first signal position and a lowered second storage position as said second member is rotated about said axis with respect to said first member; said securing means mounting said first and second members together for limited axial movement with respect to each other between a first position and a second position; axially interengaging means between said first and second members for preventing relative rotation in said first position and freely permitting relative rotation in said second position; spring means biasing said first and second members into said first position, and comprising a plurality of axially extending blind bores in one of said members opening towards the other of said members, a compressed coil spring receiving within each of said blind bores; a bearing material plunger partially received within each of said blind bores for engaging at one axial end the respective coil spring and engaging at its other axial end the adjacent face of the other of said members.

* * * * *